United States Patent
Sylvester (10) Patent No.: US 10,329,063 B2
(45) Date of Patent: Jun. 25, 2019

(54) CABLE TIE STRAP AND BUCKLE

(71) Applicant: Panduit Corp., Tinley Park, IL (US)

(72) Inventor: David J. Sylvester, Steger, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 15/785,628

(22) Filed: Oct. 17, 2017

(65) Prior Publication Data

US 2018/0111731 A1    Apr. 26, 2018

Related U.S. Application Data (60) Provisional application No. 62/410,459, filed on Oct. 20, 2016.

(51) Int. Cl.
 *B65D 63/10* (2006.01)
 *F16L 3/233* (2006.01)
 *A44B 11/00* (2006.01)

(52) U.S. Cl.
 CPC .......... *B65D 63/1072* (2013.01); *A44B 11/00* (2013.01); *B65D 63/1063* (2013.01); *F16L 3/2334* (2013.01); *B65D 2563/103* (2013.01); *Y10T 24/1498* (2015.01)

(58) Field of Classification Search
 CPC ........... B65D 63/1072; B65D 2563/103; F16L 3/2334; A44B 11/00; Y10T 24/1498
 See application file for complete search history.

(56) References Cited

U.S. PATENT DOCUMENTS

| | | | |
|---|---|---|---|
| 3,542,321 A | 11/1970 | Kahabka | |
| 3,672,615 A | 6/1972 | Fiorentino | |
| 3,886,630 A | 6/1975 | Emery | |
| 3,913,876 A | 10/1975 | McSherry | |
| 4,008,512 A | 2/1977 | Prodel | |
| 4,389,754 A | 6/1983 | Sohma | |
| 4,393,548 A | 7/1983 | Herb | |
| 4,862,561 A | 9/1989 | Lichtenberg | |
| 4,882,813 A | 11/1989 | Nakamura | |
| 5,396,684 A * | 3/1995 | Yocom | F16L 3/233 24/16 PB |
| 5,644,819 A * | 7/1997 | Lyons | B65D 63/08 24/16 PB |
| D422,487 S | 4/2000 | Khokhar | |
| 6,533,226 B2 * | 3/2003 | Geiger | F16L 3/233 248/68.1 |
| 6,763,553 B2 | 7/2004 | Hatch | |
| 7,360,281 B1 * | 4/2008 | MacCartey | B65D 63/1063 24/16 PB |

(Continued)

*Primary Examiner* — Robert Sandy
*Assistant Examiner* — Rowland Do
(74) *Attorney, Agent, or Firm* — Christopher S. Clancy; James H. Williams; Aimee E. McVady (57) ABSTRACT

A low-profile cable tie strap and buckle assembly that secures a bundle. The cable tie strap includes a head, a body with a plurality of teeth and a tip. The cable tie strap also has locking tabs that extend from each side of the cable tie strap. The buckle has a first end with a raised member defining a horizontal strap passageway and a second end with a vertical strap passageway. The cable tie strap is installed in the first end of the buckle and the locking tabs secure the cable tie strap to the buckle. The cable tie strap wraps around the bundle. The free end of the cable tie strap is installed in the second end of the buckle to secure the bundle.

16 Claims, 8 Drawing Sheets

(56) References Cited

U.S. PATENT DOCUMENTS

| | | | |
|---|---|---|---|
| 7,595,733 B2 | 9/2009 | Spagna | |
| 7,882,598 B2 | 2/2011 | Coles et al. | |
| 9,067,717 B2 * | 6/2015 | DeMik | B65D 67/02 |
| 10,053,268 B1 * | 8/2018 | Sickenberger | B65D 63/1063 |
| 2003/0066169 A1 | 4/2003 | Liu | |
| 2010/0306967 A1 * | 12/2010 | Geiger | B65D 63/14 24/16 PB |
| 2014/0096344 A1 * | 4/2014 | Creato | B65D 85/04 24/16 PB |
| 2016/0325897 A1 * | 11/2016 | Kierstead | H02G 3/30 |
| 2016/0355310 A1 * | 12/2016 | Rogers | B65D 63/1072 |
| 2017/0050786 A1 * | 2/2017 | Kozminkse | B65D 63/1027 |

* cited by examiner

CABLE TIE STRAP AND BUCKLE

CROSS-REFERENCE TO RELATED APPLICATIONS

This application claims priority to U.S. Provisional Application No. 62/410,459, filed Oct. 20, 2016, the subject matter of which is hereby incorporated by reference in its entirety.

FIELD OF THE INVENTION

The present invention relates to a cable tie strap and buckle, and more particularly to a low-profile cable tie strap and buckle.

BACKGROUND OF THE INVENTION

Cable ties are well-known for use in bundling objects such as cable bundles. Integral one-piece cable ties typically include a cable tie head with a strap insertion passageway that extends perpendicular to the strap. However, some cable tie heads have an in-line strap insertion passageway that is parallel to the strap. These in-line cable ties often have a lower head profile. Typically, the in-line style cable tie can achieve a high loop tensile strength and a low thread insertion force.

It would be desirable to provide a low-profile cable tie strap and buckle that also achieves a high loop tensile strength and a low thread insertion force.

SUMMARY OF THE INVENTION

A low-profile cable tie strap and buckle assembly designed to secure a bundle. The cable tie strap has a head, a body with a plurality of teeth and a tip. The cable tie strap also has locking tabs extending from each side of the cable tie strap. The buckle has a first end with a raised member defining a horizontal strap passageway and a second end with a vertical strap passageway. The cable tie strap is installed through the horizontal strap passageway at the first end of the buckle. The locking tabs secure the cable tie strap to the first end of the buckle. The free end of the cable tie strap wraps around a bundle and is feed through the vertical passageway in the second end of the buckle. The vertical passageway includes a locking pawl that engages the cable tie strap when the cable tie strap is tensioned around the bundle.

DETAILED DESCRIPTION

The cable tie strap and buckle of the present invention is a two-piece assembly designed to create a banding system that is easily installed and accommodates large diameter bundles or poles.

FIGS. 1-4 illustrate the cable tie strap 50 of the present invention. The cable tie strap 50 is formed from plastic. The cable tie strap 50 includes a head 52, a body 54, and a bent tip 64. The body 54 of the cable tie strap 50 is wider and thinner than typical cable ties. The wide body enables the cable tie strap to minimize pinching of the cable bundle when the cable tie strap and buckle are installed. The thinner cable tie strap body 54 increases the flexibility of the cable tie strap 50 and lowers the insertion force of the cable tie strap 50 into the buckle 80.

Each side 56 of the cable tie strap 50 includes a locking tab 58. The locking tabs 58 are positioned near the head 52. The width of each locking tab 58 gradually increases as the locking tab approaches the head 52 of the cable tie strap 50. The locking tabs 58 allow the cable tie strap 50 to lock into position when the cable tie strap 50 is installed in the buckle 80.

The cable tie strap 50 also includes blended edges 60. The blended edges 60 of the cable tie strap eliminate sharp edges that could come in contact with the cable bundle. Similar to a typical cable tie, the body 54 of the cable tie strap 50 includes a plurality of teeth 62.

The bent tip 64 enables the cable tie strap 50 to be quickly and easily inserted into the buckle 80. The bent tip 64 includes tip grips 66 and rounded tip grip edges 68. The tip grips 66 allow the operator or end user to easily grip the tip and pull it quickly through the buckle 80. The rounded tip grip edges 68 of the cable tie strap 50 allow for easier machining and eliminate sharp edges that could cut the installer or end user's fingers when installing the cable tie strap 50.

Figure 1:
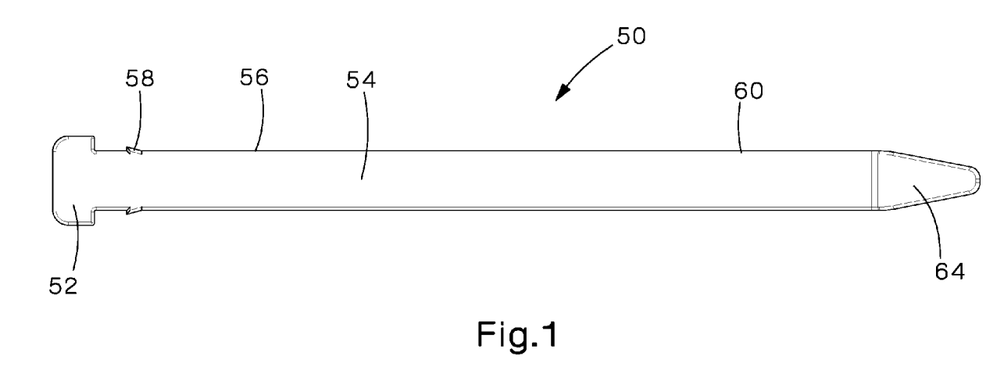
FIG. 1 is a top view of the cable tie strap of the present invention.
Figure 2:
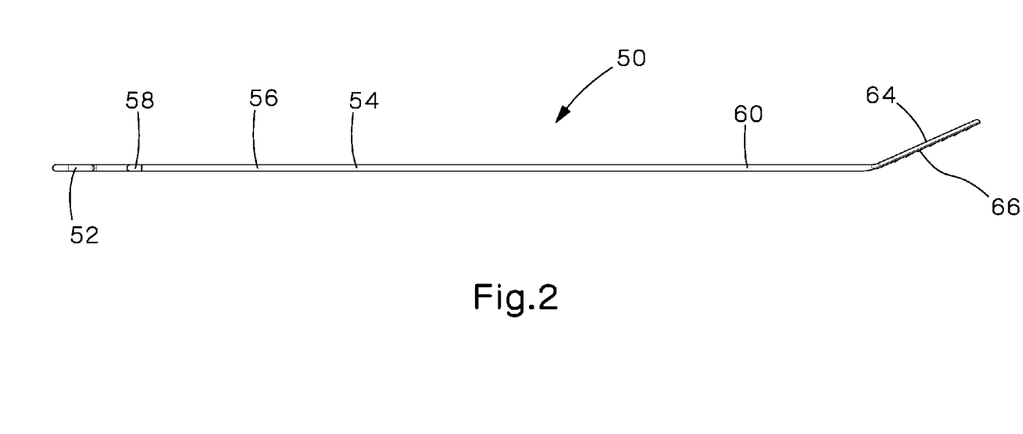
FIG. 2 is a right side view of the cable tie strap of FIG. 1.
Figure 3:
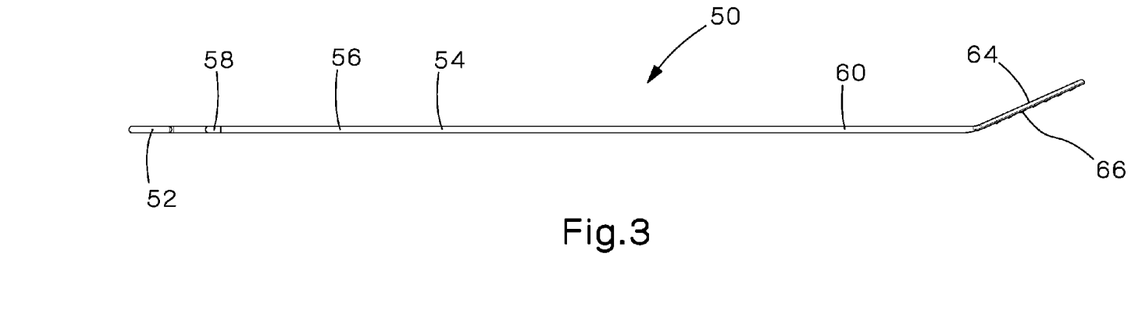
FIG. 3 is a left side view of the cable tie strap of FIG. 1.
Figure 4:
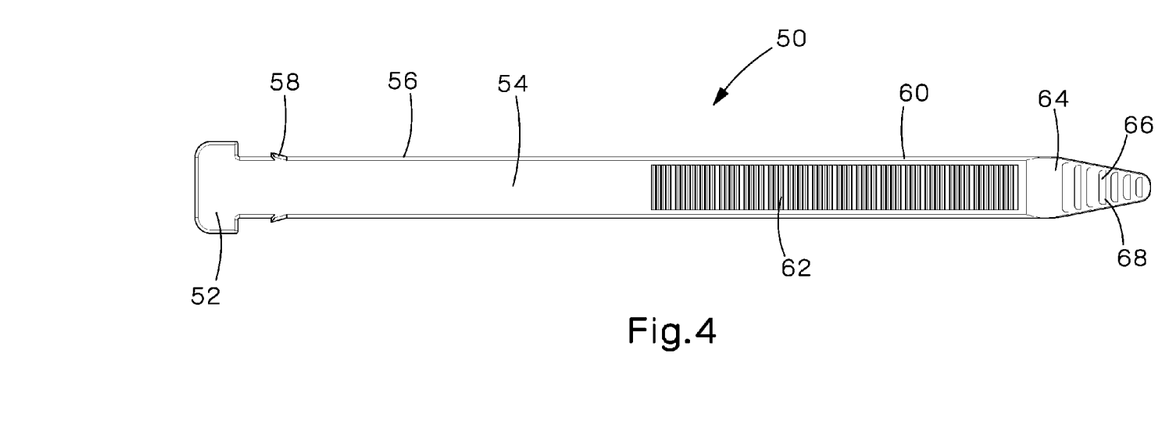
FIG. 4 is a bottom view of the cable tie strap of FIG. 1.
Figure 5:
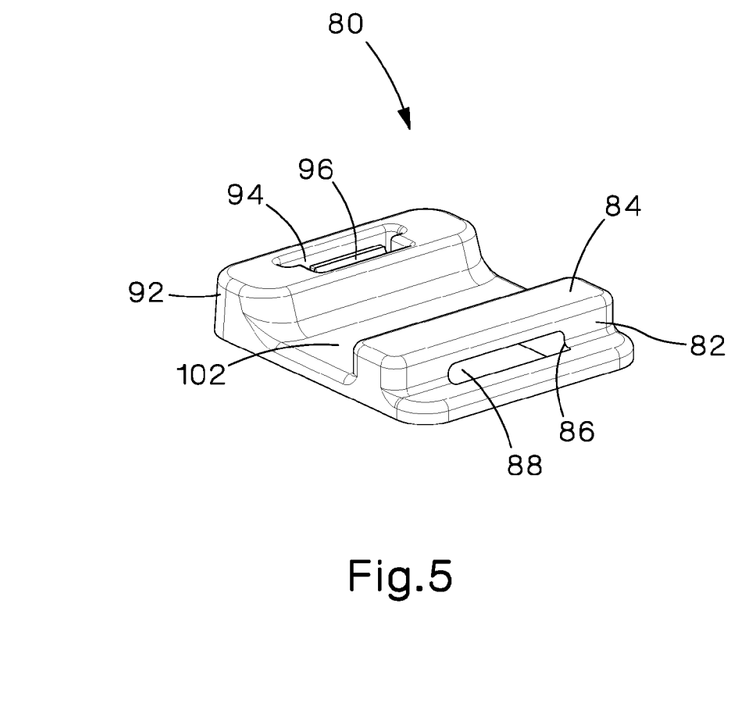
FIG. 5 is a top perspective view of the buckle of the present invention.
Figure 6:
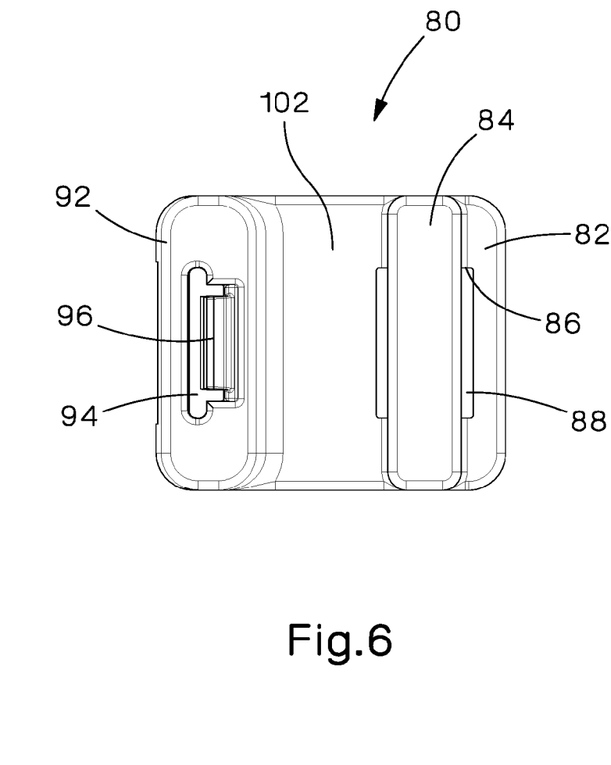
FIG. 6 is a top view of the buckle of FIG. 5.

FIGS. 5 and 6 illustrate the buckle 80 of the present invention. The buckle 80 is a low-profile plastic buckle. A first end 82 of the buckle 80 includes a raised member 84 with a guide pocket 86 extending underneath the raised member 84. The guide pocket 86 provides a horizontal passageway 88 for the cable tie strap 50. The second end 92 of the buckle 80 includes a vertical strap passageway 94. The vertical strap passageway 94 includes a locking pawl or locking wedge 96 positioned therein. The locking pawl or locking wedge 96 is designed to engage the teeth 62 on the body 54 of the cable tie strap 50 when the cable tie strap is tensioned around a bundle or pole.

The middle portion 102 of the buckle 80 is flat for receiving the head 52 of the cable tie strap 50.

Figures 7, 8:
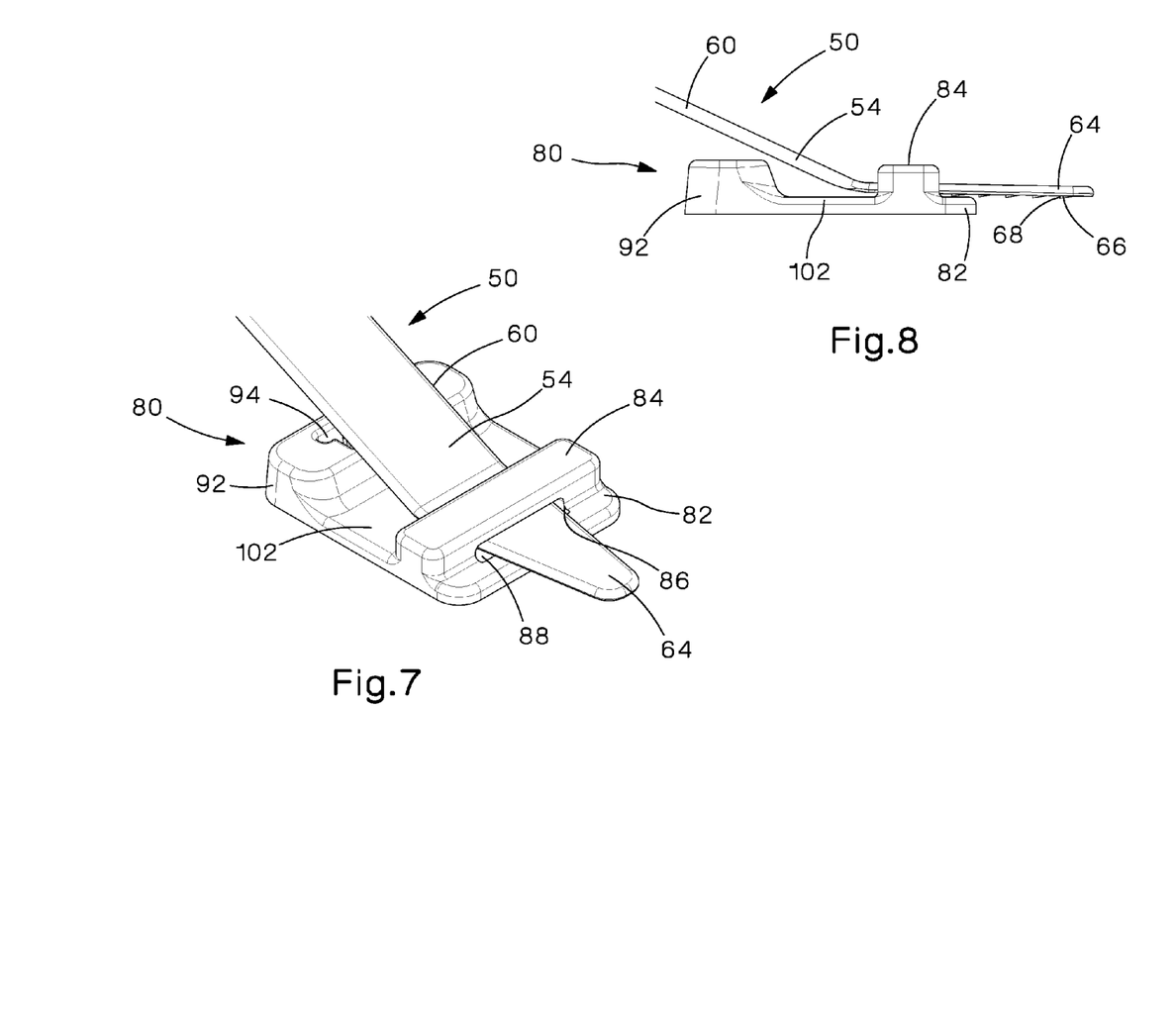
FIG. 7 is a top perspective view of the cable tie strap of FIG. 1 being inserted into the buckle of FIG. 5.
FIG. 8 is a right side view of the cable tie strap of FIG. 1 being installed in the buckle of FIG. 5.
Figures 9, 10:
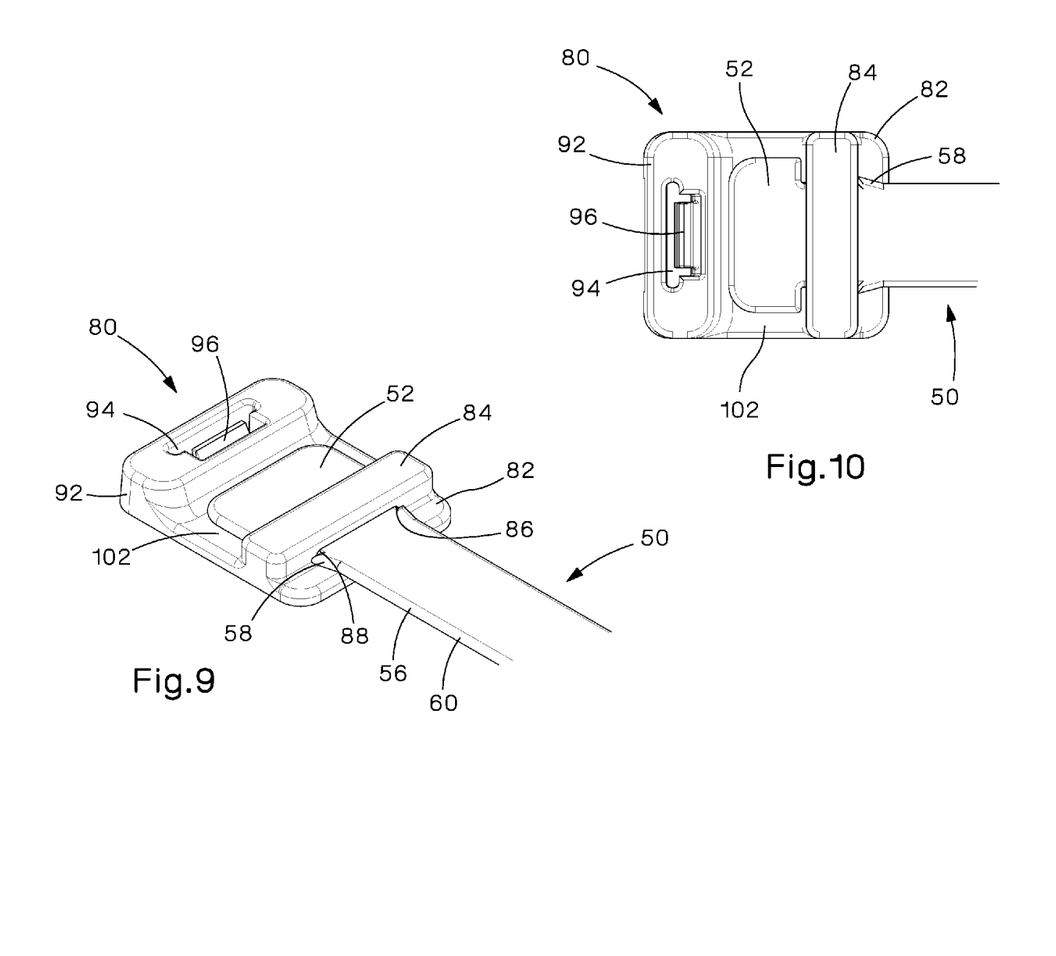
FIG. 9 is a top perspective view of a first end of the cable tie strap installed in the buckle of FIG. 5.
FIG. 10 is a top view of the cable tie strap and buckle of FIG. 9.

FIGS. 7-10 illustrate the cable tie strap 50 being installed in the buckle 80. The cable tie strap 50 is feed through the horizontal passageway 88 of the guide pocket 86, as illustrated in FIGS. 7 and 8. Once the locking tabs 58 exit the guide pocket 86, the locking tabs 58 engage the raised member 84 of the buckle 80 to prevent the cable tie strap 50 from being removed from the buckle 80. Thus, the cable tie strap 50 is secured in place when the locking tabs 58 are pulled fully through the guide pocket 86 and the head 52 is positioned on the middle portion 102 of the buckle, as illustrated in FIGS. 9 and 10. Once the cable tie strap is secured to the buckle, the assembled device can be installed around a bundle or pole similar to that of a typical plastic cable tie.

Figure 11:
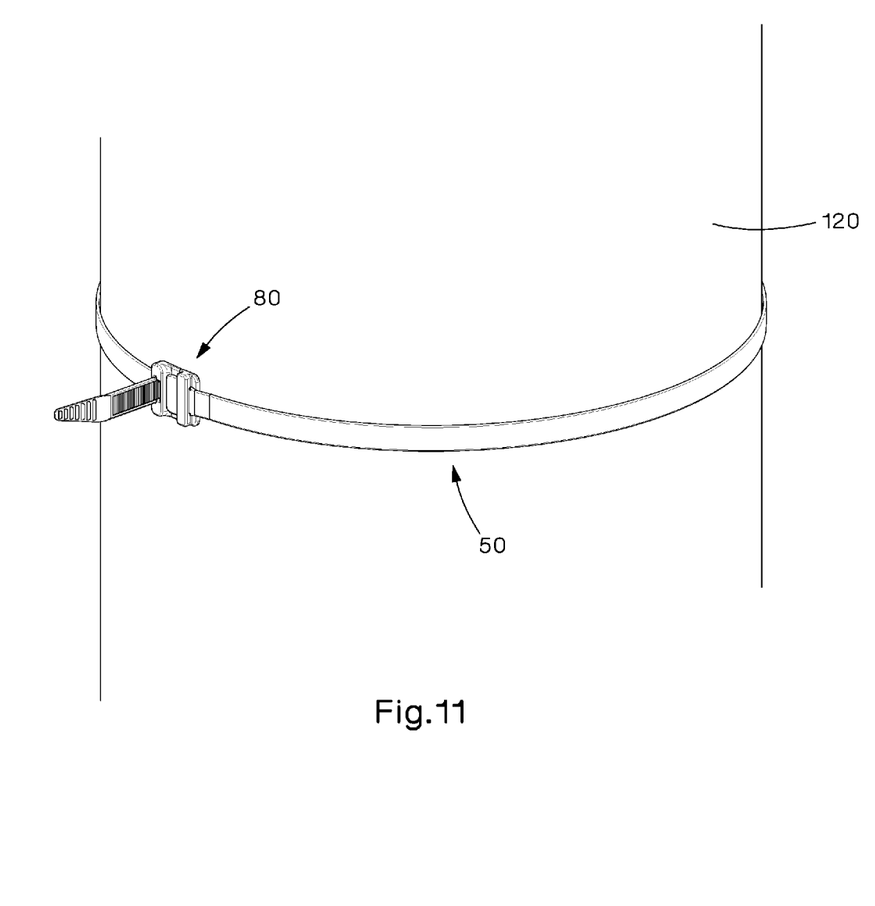
FIG. 11 is a perspective view of the assembled cable tie strap and buckle of the present invention installed around a pole.
Figure 12:
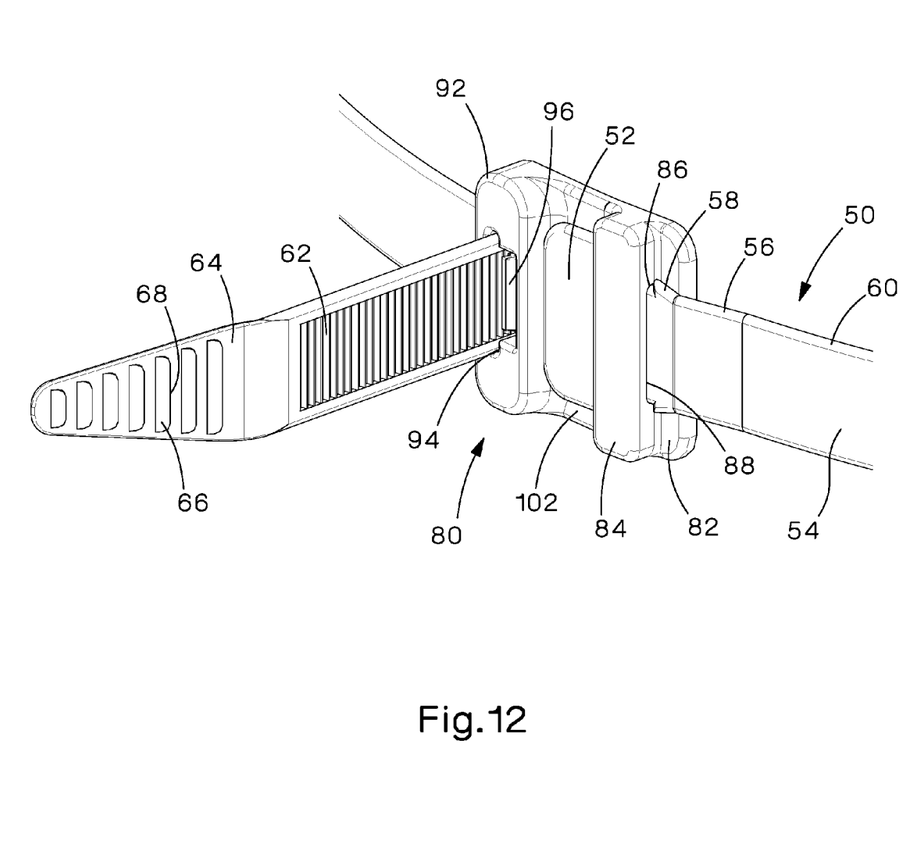
FIG. 12 is a partial perspective view of the assembled cable tie strap and buckle of FIG. 11.
Figure 13:
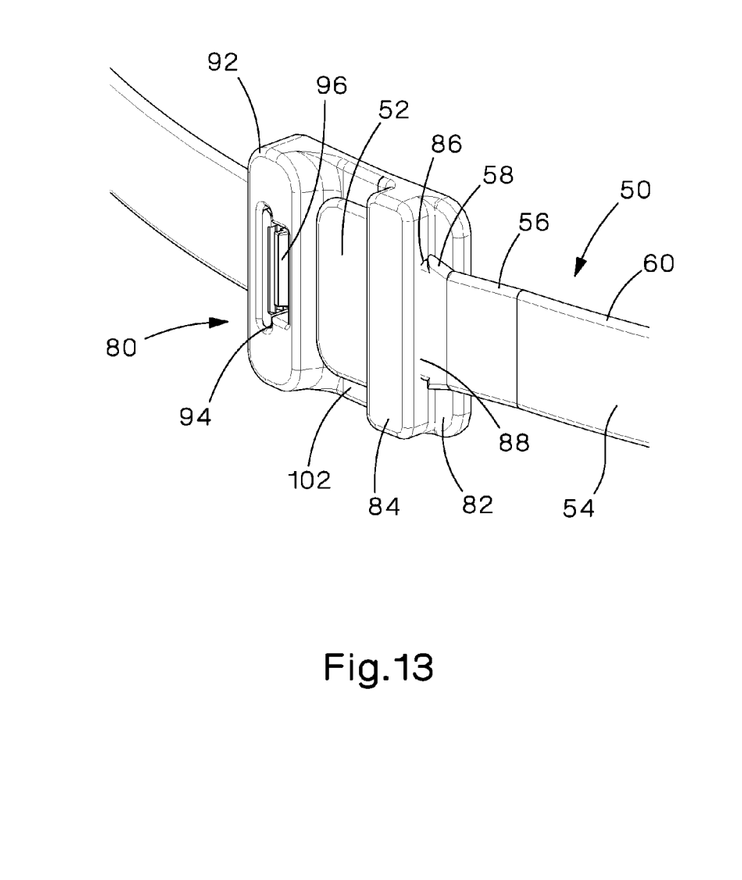
FIG. 13 is a perspective view of the assembled cable tie strap and buckle of FIG. 12 with the second end of the cable tie strap cut-off.

FIGS. 11-13 illustrate the assembled cable tie strap and buckle secured to a pole. Once the cable tie strap 50 is secured to the first end 82 of the buckle 80, the free end of the cable tie strap 50 is wrapped around the pole and feed through the vertical strap passageway 94 at the second end 92 of the buckle 80. The cable tie strap 50 is tightened and locked in place by the locking pawl or locking wedge 96 that engages the teeth 62 of the cable tie strap 50. Once the cable tie strap 50 is secure, a cable tie cut-off tool may cut off the excess strap, as illustrated in FIG. 13.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation.

The invention claimed is:

1. A cable tie strap and buckle for securing a bundle, the cable tie strap and buckle comprising:
   a cable tie strap having a head, a body with a plurality of teeth and a tip; wherein the cable tie strap having locking tabs extending from each side of the cable tie strap; and
   a buckle receiving the cable tie strap; wherein the buckle having a first end, a middle portion, and a second end, the first end has a raised member with a horizontal strap passageway extending underneath the raised member and being parallel to the middle portion; and the second end has a vertical strap passageway separate from the middle portion and extending perpendicular to the middle portion;
   whereby the cable tie strap is installed through the horizontal strap passageway at the first end of the buckle, the cable tie strap in the horizontal strap passageway extends parallel to the middle portion and the locking tabs secure the cable tie strap to the first end of the buckle; and
   the cable tie strap wraps around a bundle and extends through the vertical strap passageway perpendicular to the middle portion of the buckle.

2. The cable tie strap and buckle of claim 1, wherein the locking tabs are positioned near the head of the cable tie strap.

3. The cable tie strap and buckle of claim 1, wherein the locking tabs have a width that gradually increases as the locking tab approaches the head of the cable tie strap.

4. The cable tie strap and buckle of claim 1, wherein the tip of the cable tie strap is bent for enabling the cable tie strap to be easily inserted into the buckle.

5. The cable tie strap and buckle of claim 1, wherein the tip has tip grips with rounded edges.

6. The cable tie strap and buckle of claim 1, wherein the cable tie strap has blended edges for eliminating sharp edges that contact the bundle.

7. The cable tie strap and buckle of claim 1, wherein the middle portion is flat for receiving the head of the cable tie strap.

8. The cable tie strap and buckle of claim 1, wherein the vertical strap passageway has a locking pawl for engaging the cable tie strap.

9. The cable tie strap and buckle of claim 1, wherein the buckle is a low-profile plastic buckle.

10. A method of assembling a cable tie strap and buckle to secure a bundle, the method comprising the steps of:
    providing a cable tie strap having a head, a body with a plurality of teeth and a tip, wherein the cable tie strap having locking tabs extending from each side of the cable tie strap, and a buckle having a first end, a middle portion, and a second end, the first end having a raised member and a horizontal strap passageway underneath the raised member extending in a direction parallel to the middle portion and the second end with a vertical strap passageway extending in a direction perpendicular to the middle portion;
    feeding the tip of the cable tie strap through the horizontal strap passageway of the buckle until the locking tabs exit the horizontal strap passageway; and
    whereby the locking tabs engage the raised member of the buckle to prevent the cable tie strap from being removed from the first end of the buckle.

11. The method of assembling the cable tie strap and buckle of claim 10, further comprising the step of wrapping the cable tie strap around the bundle.

12. The method of assembling the cable tie strap and buckle of claim 11, further comprising the step of feeding a free end of the cable tie strap through the vertical strap passageway in a direction perpendicular to the middle portion at the second end of the buckle.

13. The method of assembling the cable tie strap and buckle of claim 12, further comprising the steps of tightening the cable tie strap around the bundle, locking the cable tie strap by the locking pawl engaging the teeth on the cable tie strap, and cutting off excess cable tie strap.

14. A two-piece assembly for securing a bundle, the two-piece assembly comprising:
    a buckle having a first end, a middle portion, and a second end; the first end having a raised member with a guide pocket underneath, the guide pocket defines a horizontal strap passageway that extends in a direction parallel to the middle portion, the second end of the buckle includes a vertical strap passageway that extends in a direction perpendicular to the middle portion; and
    a cable tie strap installed in the buckle, wherein the cable tie strap has a head, a body with a plurality of teeth, and a bent tip; wherein the cable tie strap having locking tabs extending from each side of the cable tie strap near the head of the cable tie strap, the locking tabs secure the cable tie strap to the first end of the buckle.

15. The two-piece assembly of claim 14, wherein the cable tie strap is routed through the horizontal strap passageway at the first end of the buckle, wherein the cable tie strap extends parallel with respect to the middle portion of the buckle; and the cable tie strap is routed through the vertical strap passageway at the second end of the buckle, wherein the cable tie strap extends perpendicularly with respect to the middle portion of the buckle.

16. The two-piece assembly of claim 14, wherein the vertical strap passageway includes a locking pawl positioned therein, whereby the locking pawl engages teeth on the cable tie strap when the cable tie strap is routed through the vertical strap passageway.

* * * * *